US006793430B1

(12) United States Patent
Liu

(10) Patent No.: US 6,793,430 B1
(45) Date of Patent: Sep. 21, 2004

(54) STRUCTURE OF A MULTI-FUNCTIONAL BOARD ERASER

(76) Inventor: Yu-Hsuan Liu, P.O. Box 82-144, Taipei (TW)

( * ) Notice: Subject to any disclaimer, the term of this patent is extended or adjusted under 35 U.S.C. 154(b) by 0 days.

(21) Appl. No.: 10/797,190

(22) Filed: Mar. 11, 2004

(51) Int. Cl.[7] .......................................... B23K 23/02

(52) U.S. Cl. ......................... 401/131; 401/52; 401/195; 15/209.1

(58) Field of Search .......................... 401/131, 52, 195; 15/104.92, 209.1, 210.1, 231, 232, 145

(56) References Cited

U.S. PATENT DOCUMENTS 3,110,917 A * 11/1963 McPeek, Jr. .................. 15/118
3,986,224 A * 10/1976 Yang ........................... 15/114
4,543,680 A * 10/1985 Vlahos ........................ 15/145

* cited by examiner

*Primary Examiner*—Gregory L. Huson
*Assistant Examiner*—Huyen Le
(74) *Attorney, Agent, or Firm*—Leong C. Lei

(57) ABSTRACT

An improvement in the structure of a multi-functional board eraser comprising a long bar body, a shallow trough installed on the top of the body for the embedding of a wiping cloth wrapped around a magnetic element. The two sides of the body have symmetrical set troughs installed, lower parts are installed inside the set troughs, and clipping parts are installed on the front and rear of the inner surface of the set troughs for the embedding of the white board markers inside the said set troughs. When the white board marker is needed, the front part of the white board marker can be pushed down to make the rear end rise to be taken out conveniently. The wiping cloth not only serves as a wipe out for the markers on the white board, but with the magnetic element wrapped inside, it can attach to the white board to prevent the board eraser from falling or missing.

2 Claims, 3 Drawing Sheets

STRUCTURE OF A MULTI-FUNCTIONAL BOARD ERASER

BACKGROUND OF THE INVENTION (a) Technical Field of the Invention

The present invention concerns an improvement in the structure of a multi-functional board eraser, especially a structure that contains white board markers and can attach to the white board to make the board eraser a more effective product.

(b) Description of the Prior Art

When using general white boards, a specialized white board marker is used to write, and afterwards erased with a board eraser. This prior art board eraser structure is separated from the white board markers and the white board. Therefore, there are often cases of missing white board markers or board erasers falling to the floor, especially when there are white board markers of many colors, which makes it even more difficult to collect the writing equipments. Although the bottom of the white board usually has a stopping board installed for the placing of board erasers and white board markers, but they are usually scattered or misplaced, so it is still inconvenient.

SUMMARY OF THE INVENTION

The main object of the present invention is to provide a multi-functional board eraser structure improvement, so that the board erasers and white board markers may be gathered up for storage to prevent them from falling or missing, and to add to the practical value of the board eraser.

The aforementioned board eraser structure comprises of a long bar shape, and above the long bar shape a shallow trough is installed for the embedding of a wiping cloth wrapped around magnetic elements. The two sides of the long bar body have two symmetrical set troughs installed individually, and the inside of the set troughs have a lower part installed. This is for the embedding of different color of white board markers into the said troughs, so that when using the white board marker, by access to the lower part of the set trough, the front part of the white board marker may be pushed down and the rear part will rise up to be taken out conveniently.

The preceding board eraser structure, wherein the wiping cloth not only serves as a wipe out for the markers on the white board, but also by the magnetic element in which it wraps, it attaches to the white board to prevent the board eraser and the white board markers from falling or missing.

The preceding board eraser structure, wherein the set troughs installed on the two sides of the body, due to the clipping points installed on the font and rear of the inner surface, it is convenient for the embedding and securing of the white board markers.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
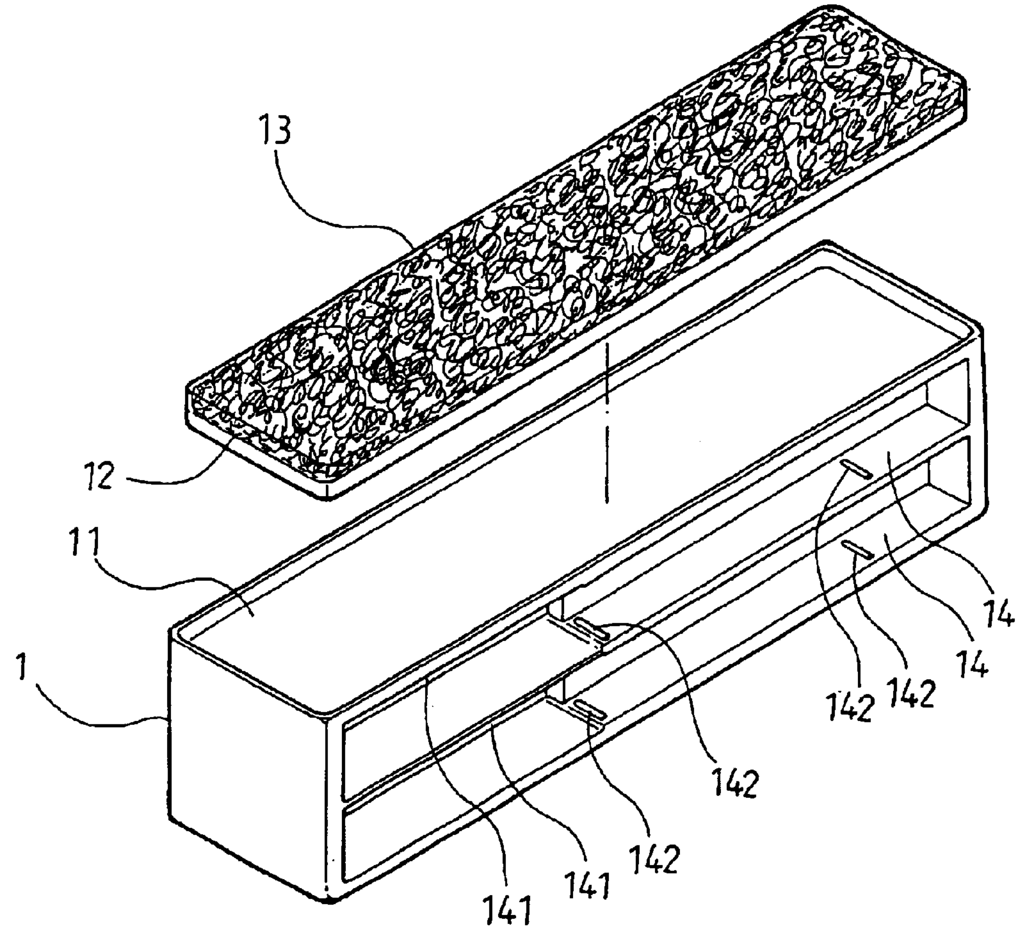
FIG. 1 is an exploded view of the present invention.
Figure 2:
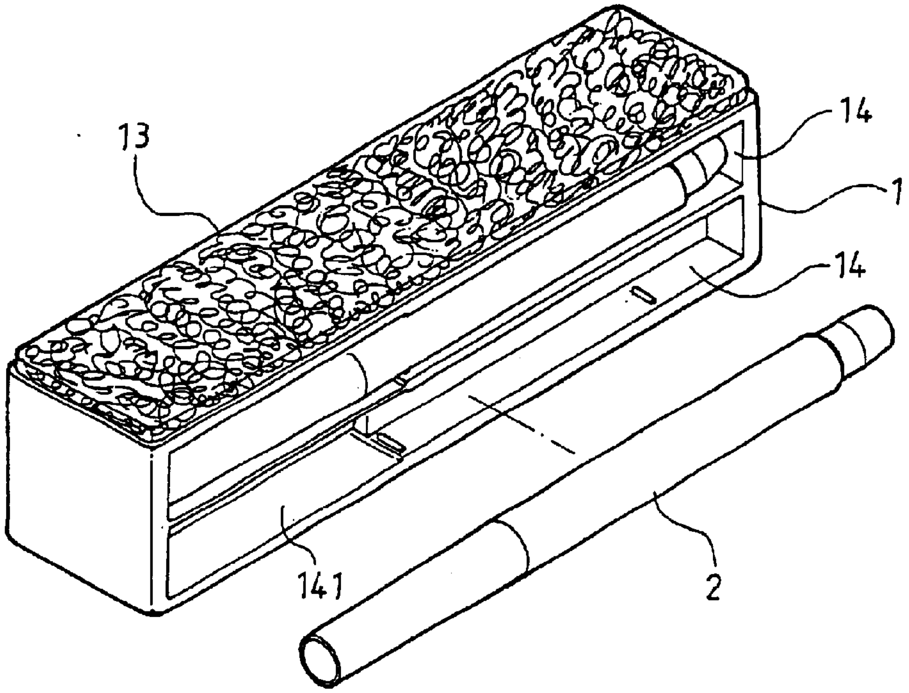
FIG. 2 is a perspective view of the present invention.

Referring to FIG. 1 and FIG. 2, the present invention mainly comprises of a long bar body 1; the top of the body 1 has a shallow trough 11 installed for the embedding of a wiping cloth 13 wrapped around a magnetic element 12. The two sides of the body 1 have two symmetrical set troughs 14 individually installed, and a lower part 141 installed on the inner surface of each of the set troughs 14. Also installed on the inner surface is the long clipping point 142, each on the front and rear of the inner surface.

By access to the assembling of the preceding components, different colors of the white board marker 2 can be contained individually in different set troughs 14. With the help of the clipping point 142 to embed and secure, it can be easily taken out for usage by pushing down the front part of the white board marker 2 to make the rear end rise up. The wiping cloth 13 not only serves as a wipe out for markers on the white board, but also by the magnetic element in which it wraps, it attaches to the white board to prevent the board eraser and the white board markers from falling or missing.

Figure 3:
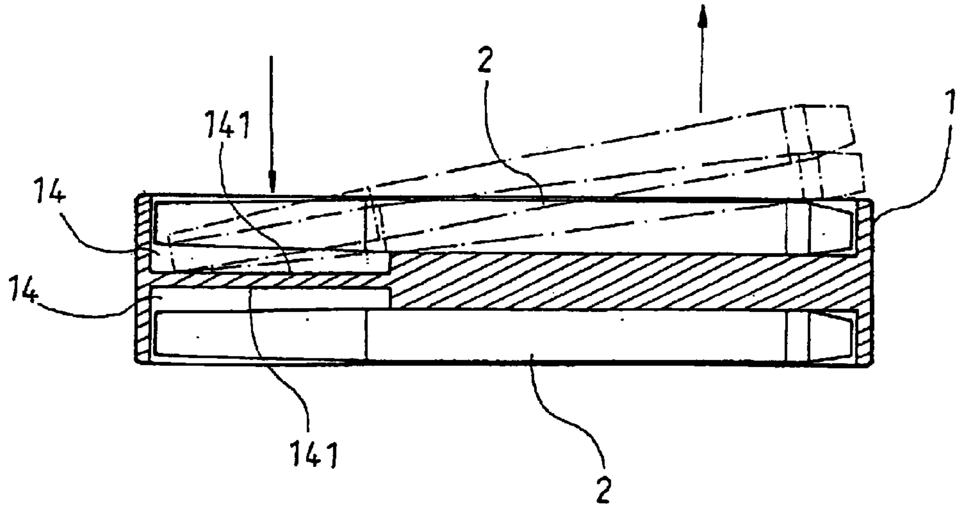
FIG. 3 is a sectional drawing of the present invention.
Figure 4:
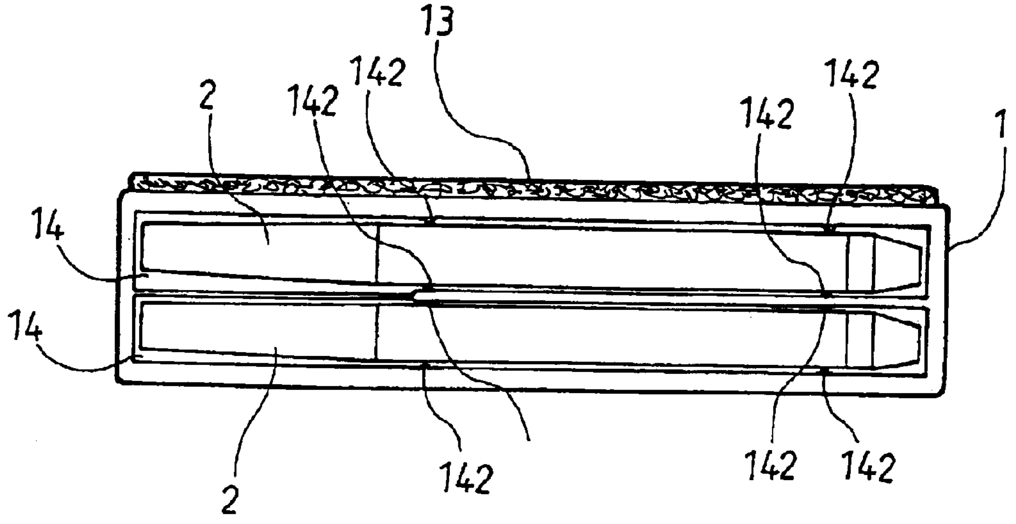
FIG. 4 is a lateral view of the present invention.

Referring to FIG. 3 and FIG. 4, when the present invention is put to use, differently colored white board markers 2 are put into different set troughs 14, and with the help of the clipping points 142 inside the set troughs 14, the white board markers 2 are embedded and secured. Numerous white board markers 2 are gathered for storage to prevent being lost from misplacing. As for the need to use the white board markers 2, the front part of the white board marker 2 can be pushed down, due to the lower part 141 being installed inside the set troughs 14. The front part of the white board marker 2 will follow the lower part 141 and go down, at the same time the rear end of the white board marker 2 will rise up for the convenience of being taken out to write on the white board, and after the writing is finished, it can be put back into the set troughs 14.

Figure 5:
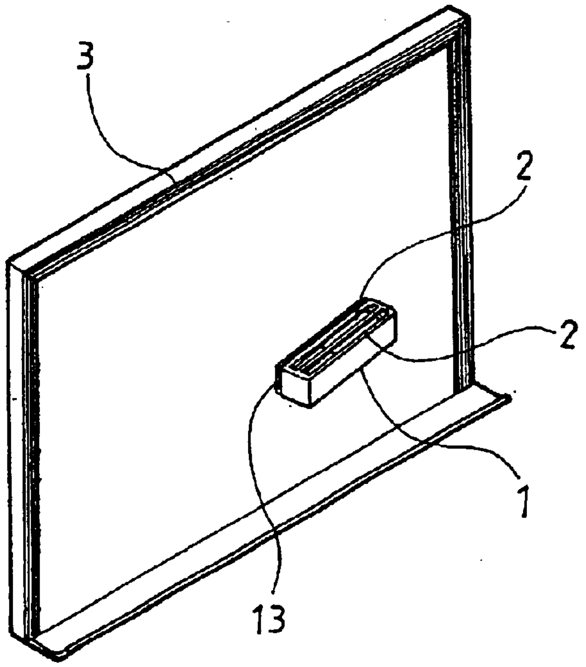
FIG. 5 is an embodiment of the present invention.

As illustrated in FIG. 5, when the present invention is put to use, the body 1 which contains the white board markers 2 can be attached to any part on the white board 3. This is to enable the white board markers 2 to move along with the body 1 to prevent the white board markers 2 from being lost When they are needed for writing, different colors of white board markers 2 can be taken out from the body 1 casually, so it is very convenient.

To sum up, the present invention has set troughs and magnetic elements installed to enable the gathered containment and for the board eraser to attach to the white board. All these are to prevent the falling and missing of the board eraser and the white board markers, so it really is a practical design, and an invention possessing novelty.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multi-functional board eraser structure improvement comprising:

a body which is in a long bar shape, and the top of it has a shallow trough installed, the two sides have symmetrical set troughs installed, and lower parts installed inside the set troughs;

a wiping cloth embedded in the shallow trough of the body, and a magnetic element is wrapped inside the wiping cloth;

by access to the assembling of the preceding components, different colors of white board markers can be embedded in the set troughs, and the front part of the white board marker can be pushed down so the rear part will rise up to be taken out when in use, and the wiping cloth not only serves as a wipe out but also attaches to the white board to prevent the board eraser and the white board markers from falling or missing.

2. A multi-functional board eraser structure improvement as claimed in claim 1, wherein long clipping points are installed on the front and rear of the inner surface of the set troughs for the embedding and securing of white board markers.

* * * * *